United States Patent
Shiiki et al.

[11] Patent Number: 6,077,458
[45] Date of Patent: Jun. 20, 2000

[54] PHOSPHOR, AND CATHODE-RAY TUBE AND DISPLAY USING THE SAME

[75] Inventors: Masatoshi Shiiki, Musashimurayama; Hisashi Toyama, Kokubunji; Hidetsugu Matsukiyo, Kawagoe, all of Japan

[73] Assignee: Hitachi, Ltd., Tokyo, Japan

[21] Appl. No.: 08/809,199

[22] PCT Filed: Sep. 11, 1995

[86] PCT No.: PCT/JP95/01795

§ 371 Date: Jun. 25, 1997

§ 102(e) Date: Jun. 25, 1997

[87] PCT Pub. No.: WO96/09353

PCT Pub. Date: Mar. 28, 1996

[30] Foreign Application Priority Data

Sep. 20, 1994 [JP] Japan .................................. 6-224500

[51] Int. Cl.$^7$ .......................... C09K 11/02; C09K 11/56; H01J 29/20; H05B 33/14
[52] U.S. Cl. ........................ 252/301.4 R; 252/301.6 S; 428/403; 428/404; 313/467; 313/468; 313/461; 313/463; 313/486; 313/503
[58] Field of Search ................... 252/301.4 R, 301.6 S; 428/404, 403; 313/467, 468, 461, 463, 503, 486

[56] References Cited

U.S. PATENT DOCUMENTS

| | | | |
|---|---|---|---|
| 3,522,071 | 7/1970 | Yokota et al. | 252/301.6 S |
| 3,814,967 | 6/1974 | Takata et al. | 252/301.4 F |
| 4,071,640 | 1/1978 | Ignasiak | 252/301.4 R |
| 4,172,920 | 10/1979 | Kanda et al. | 252/301.6 S |
| 4,339,501 | 7/1982 | Inoue et al. | 428/404 |
| 4,377,769 | 3/1983 | Beatty et al. | 252/301.6 S |
| 4,515,827 | 5/1985 | Dodds et al. | 252/301.6 S |
| 4,772,818 | 9/1988 | Koike et al. | 252/301.6 S |
| 4,801,398 | 1/1989 | Ohno et al. | 252/301.4 R |
| 5,041,334 | 8/1991 | Nakajima et al. | 252/301.4 R |

FOREIGN PATENT DOCUMENTS 59-202284  11/1984  Japan .

OTHER PUBLICATIONS

Derwent Abstract For JP59–202284.

*Primary Examiner*—C. Melissa Koslow
*Attorney, Agent, or Firm*—Antonelli, Terry, Stout & Kraus, LLP

[57] ABSTRACT

The current coefficient and saturation brightness of a phosphor is increased by coating the surfaces of phosphor particles (11, 21, 41) constituting a powdered phosphor with layers (12, 22, 42), preferably composed of phosphor, of 5 $\mu$m, or less in thickness. A cathode-ray tube using this phosphor has a high luminance and/or a high resolution. If the above phosphor contains phosphor particles covered with electrically conductive phosphor and is used for an electroluminescence device or a vacuum fluorescent display, the life time and stability are improved.

19 Claims, 8 Drawing Sheets

PHOSPHOR, AND CATHODE-RAY TUBE AND DISPLAY USING THE SAME

TECHNICAL FIELD

The present invention relates to a phosphor, particularly, a phosphor film as a emissive type display, and to displays, particularly, a cathode-ray tube, an electroluminescence device, and a vacuum fluorescent display, using the phosphor film. The present invention also relates to spontaneously emissive type displays, particularly, an information video apparatus and an information video system.

BACKGROUND ART

Technologies for realizing high definition of cathode-ray tubes of projection type and direct view type are essential for implementing the future high definition television (hereinafter, referred to as "HDTV") broadcasting. Also, there have been strong demands toward improvement in characteristics of cathode-ray tubes used for televisions or video displays in the existing broadcasting. In particular, a projection type cathode-ray tube used as a large-sized video display needs to be improved in resolution and to be enlarged in angle of visibility. The enhancement in both definition and resolution, however, reduces brightness of a screen of a cathode-ray tube, and therefore, it must be accompanied by improvement in luminous efficiency of a phosphor used in the cathode-ray tube. Of course, the enhancement in both high definition and high resolution has come to be required for luminous type displays other than a cathode-ray tube, for example, an electroluminescence element and a vacuum fluorescent display.

Related art cathode-ray tubes of a projecting type have been described in "Singaku Technical Report, CPM93-32 (1993), pages 1–6" and "Journal of Luminescence, 48/49 (1991), pages 43–48".

Improvement in brightness of a projection type cathode-ray tube has been mainly performed by enlarging the particle size of phosphor particles and increasing the thickness of a phosphor film. The increased thickness of a phosphor film, however, causes such a problem as shown in FIG. 9. That is, for a thick phosphor film, the diameter of an electron beam (luminous spot diameter) is apparently spread by the scattering of light due to the film structure shown in FIG. 9, resulting in the degraded resolution. In FIG. 9, a phosphor film 72 (thickness indicated by numeral reference 94: 50 $\mu$m) is formed of phosphor particles having diameters of 10–13 $\mu$m on a face plate 71, and an Al reflection film 91 is provided on the phosphor film 72. In the case where an electron beam (diameter indicated by reference numeral 92: 110 $\mu$m) impinges on the phosphor film 72 through the Al reflection film 91 and ejects from an opposing surface of the face plate 71 to the phosphor film 72, a profile 95 of a luminous spot of the electron beam becomes thicker than the incident electron beam as shown in FIG. 9. Concretely, the luminous spot diameter 93 becomes 180 $\mu$m, which is 70 $\mu$m thicker than the incident electron beam diameter 92 (110 $\mu$m). The beam increment (70 $\mu$m) indicated by reference numeral 96 is produced depending on scattering of light in the phosphor film 72 and luminous saturation of the phosphor. In FIG. 9, reference numeral 97 indicates a locus of fluorescence due to scattering and reflection of light in the phosphor film 72.

The reason why the above technique of increasing the thickness of a phosphor film, which has a problem in terms of degradation of resolution, is applied to a phosphor film of a cathode-ray tube, is that the substantial efficiency of the phosphor is reduced by increasing the density of an excitation current of the cathode ray tube. Specifically, the gradient (current coefficient) of a relationship of a luminous intensity (logarithmic scale) to an excitation current intensity (logarithmic scale) of a phosphor is deviated from the linearity, and the increase in luminous intensity becomes blunt (that is, brightness is saturated). Such a reduction in current coefficient is one of important problems of the existing projecting type cathode-ray tube. In particular, a large problem resides in reduction in current coefficient of a blue component of a blue phosphor (ZnS: Ag) in a high irradiation current range, as shown in FIG. 8. As for the blue phosphor, the spot diameter due to light scattering is significantly degraded because the particle size of the phosphor particles is 10 $\mu$m or more and the thickness of the phosphor film is 50 $\mu$m or more. To obtain a cathode-ray tube with a high definition and a high brightness for meeting the future requirements for high definition, there must be realized a phosphor reduced in particle size and a phosphor film thinned in thickness by solving the essential problem, that is, reduction in current coefficient.

Such a problem in characteristics is common to a green phosphor (ZnS: Cu) of a direct view type cathode ray tube. In the direct view type cathode-ray tube, an excitation density per unit area of a phosphor is also increased accompanied by the enlarged size of a screen and the enhanced definition of the cathode-ray tube. The enlarged size of the screen broadens a width of a line along which an electron beam is scanned, so that a residence time of the electron beam is shortened at each luminous point, with a result that a substantial exciting time is shortened, that is, the brightness is reduced. For the cathode-ray tube having a large-sized screen, the amount of an excitation current is increased for compensating for reduction in brightness, to strengthen the excitation current density of the phosphor. One of attempts to improve brightness is to enlarge the particle size of phosphor particles like a projecting type cathode-ray tube; however, the attempt is disadvantageous in reducing the resolution or increasing such a feeling that the screen is roughened thereby reducing the uniformity of the screen. In addition, the increased particle size of phosphor particles improves the quality of fine crystals of a powder by i) improving the crystal quality of particles of a powdered phosphor, ii) dispersing the luminescence center, and iii) reducing the influence of surface defects due to reduction in specific surface area, to thereby improve the brightness of the phosphor screen.

As can be seen from the above description, the improvement in current coefficient which is an essential problem, is required for further enhancing brightness.

Accordingly, the basic cause, which is common to reduction in resolution and brightness, lies in reduction in a current coefficient $\gamma$, and therefore, it becomes apparent that the increase in such a current coefficient $\gamma$ is most effective for improving the brightness and resolution of a cathode-ray tube.

The current coefficient $\gamma$ is a non-dimensional number, and is given by an index $\gamma$ of a relationship that a brightness B of a phosphor screen is proportional to the $\gamma$-th power of an irradiation current density Ik by irradiation of an electron beam. The relationship is given by the following equation:

$$B \, Ik \, \gamma$$

In the above-described related art cathode-ray tube, the improvement in brightness has been performed by enlargement of particles size of phosphor particles without improvement in current coefficient γ, and an examination has been not sufficiently made to further improve brightness without reduction in resolution. In view of the foregoing, there have been expected a phosphor material capable of realizing a high resolution by reducing a current coefficient, and a cathode-ray tube and a spontaneously emissive type display using such a phosphor material.

DISCLOSURE OF THE INVENTION

An object of the present invention is to solve the problems of the above-described related art and to provide a phosphor capable of obtaining a high brightness and/or a high resolution; to provide a phosphor film using the phosphor, which is capable of obtaining a high brightness and/or a high resolution; and to provide a display, particularly, a cathode-ray tube using the phosphor film, which is capable of obtaining a high brightness and/or a high resolution.

To achieve the above object, according to the present invention, there is provided a powdered phosphor composed of phosphor particle main bodies (added with an activator as needed), wherein the surface of each of the phosphor particle main bodies is coated with a coating layer having a thickness of 5 μm or less.

The coating layer for coating the surface of a phosphor particle may be made from one material selected from a group consisting of i) a material being the same as a material of said phosphor particle main body; ii) a material having a base material being the same as a base material of said phosphor particle main body and containing only one of an activator and a coactivator added to said phosphor particle main body; iii) a material being the same as the base material of said phosphor particle main body and not containing any activator and coactivator; and iv) a material composed of at least one element constituting the base material of said phosphor particle main body. Here, the base material means that it constitutes the phosphor and is not added with any acceptor and donor.

The coating layer made from a material in i), ii) or iii) may be coated on the outer side thereof with a high resisting film, for example, a non-luminous thin film, particularly, an oxide film such as $SiO_2$ or $Al_2O_3$, to form double surface coating layers.

The thickness of the coating layer coating the surface of each phosphor particle may be 5 μm or less, preferably, 1.5 μm or less, more preferably, 0.5 μm or less. When the thickness of the coating layer is 5 μm or more, there occurs such an inconvenience that the penetration amount of an incident electron beam into the central portion of the phosphor particle is significantly reduced. In the case where an accelerating voltage of an electron beam is in a range of 25–30 V, the penetration distance of an electron beam into the phosphor through the coating layer is in a range of 3–5 μm. Also, when the coating layer formation time is set at one hour or less, the thickness of the coating layer is generally 1.5 μm or less. The lower limit of the thickness of the coating layer is not particularly specified so long as a suitable atomic layer is formed, and it will be reduced along with the advance of the coating layer formation technique.

The particle size of each phosphor particle including a coating layer may be set at a conventional value; however, it is preferably set at 8 μm or less, more preferably, 5 μm or less from the viewpoint of improvement in resolution and definition of a display. The lower limit of the particle size may be set at 1 μm. The reason for this is that since the optimum number of stacked layers of phosphor particles for forming a phosphor film is 3 or 4, the particle size of phosphor particles is required to be 1 μm or more for ensuring the thickness of the phosphor film over the lower limit (3 μm) of the penetration distance of an incident electron beam. However, since the above lower limit of the particle size is specified when the accelerating voltage of the electron beam is set at a value of 25–30 kV, it may be somewhat changed depending on variations in accelerating voltage or the kinds of applications other than the excitation of the electron beam.

Specific examples of materials of phosphor particles may typically include (ZnS: Ag, Al); (ZnS: Ag, Cl); (ZnS: Ag, Ga); (ZnS: Cu, Al) and (ZnS: Cu, Cl). In general, in the case of using ZnS as the base material of a phosphor particle, it may be added with an acceptor composed of at least one element selected from a group consisting of Cu, Ag, Au, Na, and K, and a donor composed of at least one element selected from a group consisting of Al, Ga, In, Cl, I and Br. In some cases, ZnS is added with an activator composed of one element selected from a group consisting of Tb, Tm, Sm, Ce and Mn; and it is added with no coactivator. In the case of using the base material containing a rare earth element oxide, it may be added with one element selected from a group consisting of Eu, Tb, Tm, Ce and Mn.

In the phosphor of the present invention having the above configuration, a current coefficient γ measured by irradiating the phosphor with an electron beam at an accelerating voltage of 25 kv or more is 0.70 or more, preferably, 0.75 or more, more preferably, 0.85 or more for a current density (irradiation current divided by electron beam irradiated area) of 15 μA/cm2; and it is 0.65 or more, preferably, 0.70 or more, more preferably, 0.85 or more for the current density of 75 μA/cm2. The current coefficient γ is generally less than 1.0. When the current coefficient γ is less than the above-described lower limit, it fails to achieve the object of the present invention for obtaining a high brightness and/or a high resolution.

In the case of using a phosphor of the present invention as a phosphor film formed on a substrate, the thickness of the phosphor film may be 30 μm or less, preferably, 25 μm or less in order to obtain a high resolution. The phosphor film, however, is required to have the minimum thickness for ensuring a necessary brightness. As described above, since the phosphor of the present invention is high in brightness, the thickness of the phosphor film using the phosphor can be thinned more than the conventional one, to thereby enhance the resolution.

Further, by the use of the phosphor film of the present invention as a luminous film of a display, particularly, a cathode-ray tube, it is possible to obtain a spontaneously luminous type display, particularly, a cathode-ray tube with a high brightness and/or a high resolution.

A current characteristic (relationship of a luminous intensity to an irradiation current density of a phosphor) 61 of a related art phosphor and current characteristics 62, 63 of phosphors of the present invention are shown in FIG. 6. As shown in FIG. 6, according to the present invention, there can be realized a phosphor having a high current coefficient γ. The results shown in FIG. 6 will be further cited in examples which will be described later.

The reason why a phosphor of the present invention is excellent in current characteristic is considered to be dependent on reduction in density of trapping levels due to defects of phosphor particles by coating of the phosphor particles with coating layers. A thermoluminescence glow curve of a related art phosphor 51 and a thermoluminescence curve 52 of a phosphor of the present invention are shown in FIG. 5 (which will be fully cited in the description of examples). Namely, the thermoluminescence glow curves in FIG. 5 show that the density of defect levels of phosphor particles appearing at a temperature of 100° C. or more is reduced by coating the surfaces of the phosphor particles with coating layers. This means that defects of constituent elements on the surfaces of phosphor particles are eliminated by the coating layers. In other words, it means an action of repairing defects.

Specifically, when a thermoluminescence glow curve of a phosphor of the present invention is measured from room temperature after exciting said phosphor by ultraviolet rays, with emission peak wavelengths of a pair of a donor and an acceptor added to said phosphor particle main body as luminescence centers taken as monitor wavelengths, a thermoluminescence intensity of the thermoluminescence glow curve at a temperature of 100° C. or more may be specified to be one-third or less of an intensity of the initial peak appearing near room temperature.

In this way, the coating layer for repairing defects on the surfaces of phosphor particles may be formed of a single element on the principle; however, to enhance stability, it may be formed of a thin film. Further, the thin film may be composed of a less defect film formed at a low temperature.

As described above, according to the present invention, it is possible to obtain a phosphor having a high current coefficient by reducing the density of the trapping levels due to defects on the surfaces of particles of the phosphor.

By the use of the phosphor having such a high current coefficient, there can be realized a cathode-ray tube or a spontaneously emissive type display, which has a high definition and a high resolution. And, by the use of the phosphor coated with an electrically conductive coating layer according to the present invention, there can be realized an electroluminescence device or a vacuum fluorescent display, which is excellent in service life and stability.

The coating layer is desirably configured not to absorb the emission spectrum of the phosphor particle main body. This can be realized by specifying the emission spectrum of the coating film, particularly, the main wavelength thereof to be equal to the emission spectrum of the phosphor particle main body, particularly, the main wavelength thereof or to be shifted on the high energy side (that is, short-wavelength side) thereof. For this purpose, the concentration of a luminescence center added to the base material of the phosphor particle main body may be higher than that of a luminescence center added to the phosphor thin film as the coating film. Concretely, the concentration of an activator and a coactivator in the phosphor particle main body (for the base material of ZnS, the concentration of Ag, Cu, Al and the like, particularly, the concentration of Al) may be higher than that in the coating film. However, the configuration in which the coating film is configured not to absorb the emission spectrum of the phosphor particle main body is not an essential requirement in the present invention.

Although the luminous efficiency is reduced when the particle size of a phosphor particle is made smaller in the related art, such a reduction in luminous efficiency can be suppressed by formation of a coating layer or a phosphor film on the surface of the phosphor particle, to thereby realize a small-sized phosphor with a high current coefficient. This makes it possible to realize a thin phosphor film being high in current coefficient, and hence to realize a projection type or direct view type cathode-ray tube with a high brightness and a high resolution. In addition, according to the present invention, it is possible to further enhance the current coefficient of a phosphor having a conventional particle size, and hence to provide a cathode-ray tube or a display, which has a high brightness.

For the phosphor of the present invention, since each phosphor particle main body is coated with a thin film, the surface of the phosphor particle is formed of the deposited film surface, and therefore, it becomes rough as compared with the phosphor not coated with thin films. In addition, the surface thin film of each particle of the phosphor of the present invention can be observed by SEM (scanning electron microscope).

BEST MODE FOR CARRYING OUT THE INVENTION

Figure 1:
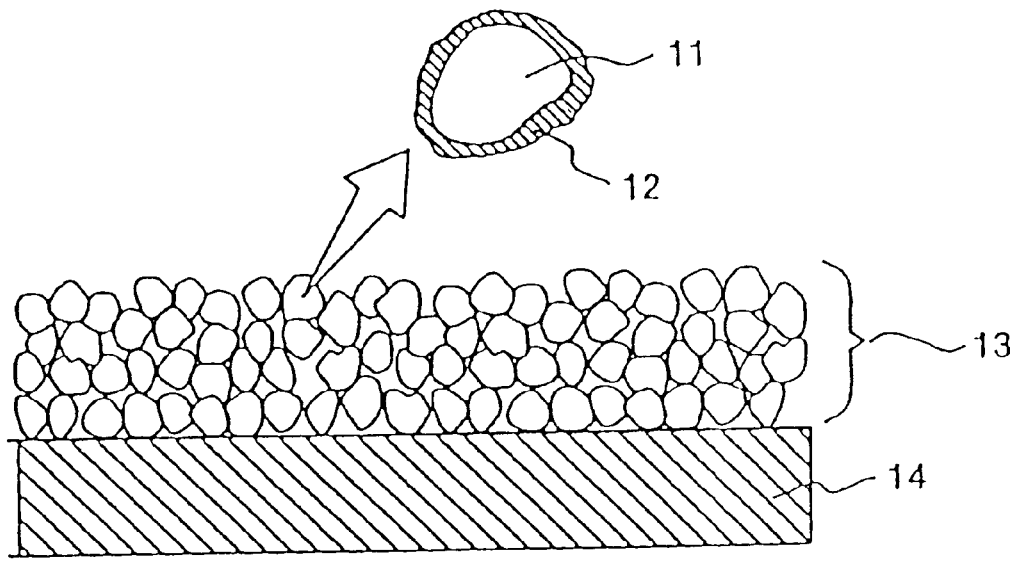
FIG. 1 is a schematic sectional view showing a structure of a phosphor of the present invention.

To increase the luminous efficiency of a small-sized phosphor effective for achieving high resolution, the increased concentration of non-luminescence center accompanied by reduction in particle size is required to be reduced. For this purpose, for example, it is desired to reduce surface defects of the phosphor particle because the surface defects are increased along with the increased specific surface area due to reduction in particle size of the phosphor particle, with a result that the density of trapping levels is made larger, to thereby increase the concentration of a non-luminescence center, resulting in the degraded brightness. Even for a phosphor having the conventional particle size, surface defects present on the particles of the phosphor are desirable to be reduced. In this regard, according to the present invention, an attempt was made to prevent surface defects from being produced on surfaces of phosphor particles by coating the surfaces of the phosphor particles with desired coating layers such as thin films of a phosphor after synthesis of the phosphor particles. An upper half of FIG. 1 shows a schematic cross-section of a phosphor in which the surface of a phosphor particle main body is coated with a coating layer. For example, the surface of a phosphor particle main body 11 having a diameter of 5–8 μm is coated with a coating layer 12. A coating layer such as a phosphor thin film, which is singly formed by a thin film formation process such as a vapor-phase growth process, has a density equivalent to 70% or more of the true density of the bulk material, and exhibits a high resistance against external energy irradiation (the density of a material formed by compaction of a powder is less than 70% of the true density). Such a film is effective to reduce surface defects of a phosphor particle and to improve the crystal quality of the phosphor particle. As shown in the lower half of FIG. 1, a phosphor film 13 (thickness: for example, 25 μm) is formed of such phosphor particles on a suitable substrate 14, to form a luminous element used for a display. Hereinafter, a phosphor of the present invention; and a direct view type cathode-ray tube, a projection type cathode-ray tube, and a spontaneously emissive type display, each of which employs the phosphor, will be described in detail with reference to examples.

EXAMPLE 1

In this example, phosphor particles 11 were synthesized, and surfaces of the phosphor particles 11 were each coated with phosphor thin films 12 by a MOCVD (Metal Organic Chemical Vapor-phase Deposition) process. Here, there was used a blue phosphor (ZnS: Ag, Al) mainly containing ZnS added with Al (250 ppm) as a donor and Ag (500 ppm) as an acceptor, and having an average particle size of about 11 μm. Surfaces of these phosphor particles as nuclei were each coated with thin films of a phosphor of ZnS: Ag, Al (Al=250 ppm, Ag=500 ppm) to a thickness of about 3 μm, to prepare a surface-coated phosphor. In this case, it is desired that the concentration of the luminescence center added in the base material of the phosphor particle main body is higher than that of the luminescence center added in the phosphor thin film. This allows an emission spectrum of the phosphor thin film to be equal to an emission spectrum of the phosphor particle main body or to be shifted on the higher energy side thereof, with a result that the coating layer is configured not to absorb the emission spectrum of the phosphor particle main body. This makes it possible to use a phosphor having a high current coefficient without reduction in color purity thereof.

Next, a process of producing a surface-coated phosphor will be concretely described. First, in this example, phosphor particles were synthesized, and were subjected to surface coating by MOCVD. In addition, the present invention can be applied to a phosphor synthesized by any process.

Hereinafter, a process of producing a phosphor used in this example will be described. First, a powder of ZnS was added with a suitable amount of a salt containing Ag such as silver nitrate as a raw material of an acceptor Ag, and was also added with Al or Cl as a donor. In this example, the amount of the acceptor Ag was set at 500 μg on the basis of 1 g of the base material (ZnS), and the amount of the donor Al was set to be about twice the amount of Ag in terms of atomic number ratio. Here, any low melting point compound such as a halogenated alkali as a flux is not added. This is because the addition of a flux is undesirable from the viewpoint of improvement in current coefficient. The mixture of the raw materials of the phosphor was synthesized in a sulfidizing atmosphere. A solid or liquid sulfur material such as a powder of sulfur or carbon disulfide may be used as a sulfidizing agent, but in this example, a hydrogen sulfide gas was used, and the synthesizing time was set at two hours. At this time, the synthesizing temperature was set at 1200° C. to provide a hexagonal ZnS phosphor.

Figure 3:
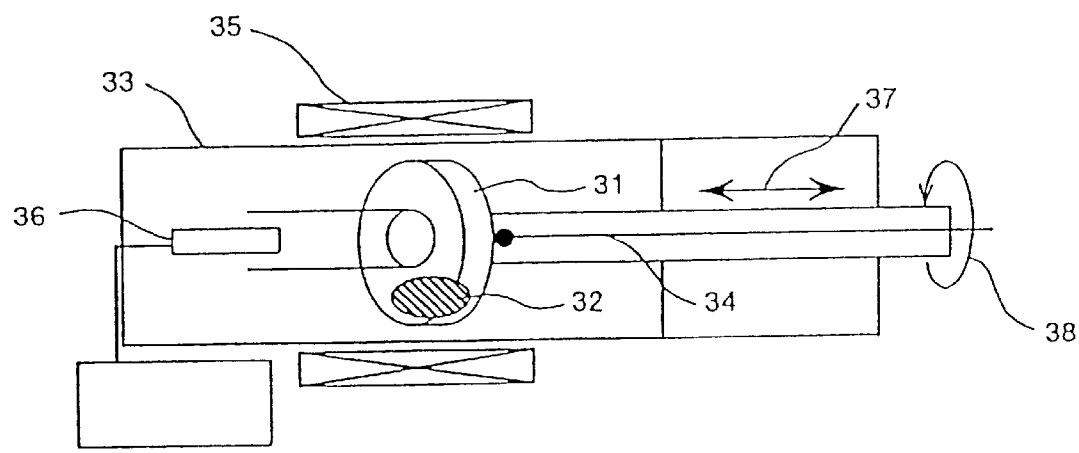
FIG. 3 is a schematic view illustrating an apparatus for coating surfaces of phosphor particles by a chemical vapor-phase deposition process used in some examples of the present invention.

In this example, surfaces of particle main bodies (as nuclei) of the phosphor thus obtained were each coated with thin films of a phosphor having a composition of (ZnS: Ag, Al) by MOCVD. FIG. 3 is a view showing the concept of a surface coating apparatus used in this example. In this surface coating apparatus, a jig 31 for holding a powder in a preparation chamber was filled with phosphor particle main bodies 32 as nuclei, and was introduced in a vapor-phase synthesizing chamber 33. An arrow 37 indicates a direction where the jig 31 is introduced in/ejected from the chamber 33. The vapor-phase synthesizing chamber 33 is so configured that the interior is evacuated by a vacuum evacuation apparatus or an air in the chamber 33 is sufficiently replaced with an inert gas. The chamber 33 has a temperature sensor 34 for measuring the temperature of the jig 31 or the phosphor particle main bodies 32 as nuclei. To heat the phosphor particle main bodies 32 as nuclei, a heating source 35 is provided in the vapor-phase synthesizing chamber 33. A raw material gas for vapor-phase synthesis is introduced from a gas nozzle 36. The jig 31 for holding particles is rotated from the outside in the direction shown by an arrow 38 during coating of the surfaces of the particles for eliminating unevenness of coating thin films due to contact between the phosphor particles. The rotation of the jig 31, however, may be replaced with other manners capable of giving motions to the phosphor main bodies as nuclei during formation of thin films. Even in this case, a sufficient effect can be obtained. The formation of thin films may be performed by other physical deposition processes. The above effect can be expected somewhat even if no motion is given to the phosphor main bodies.

Figure 4:
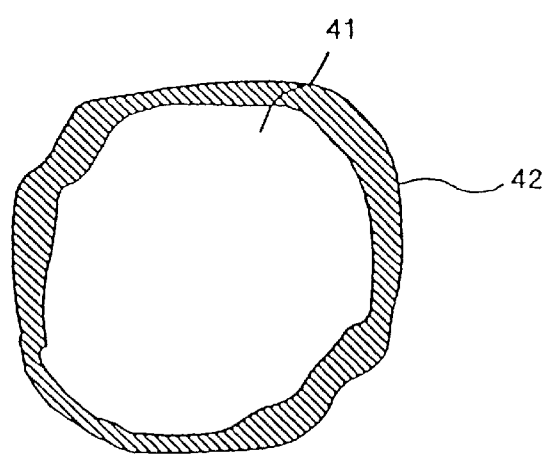
FIG. 4 is a sectional view showing a surface-coated phosphor particle prepared in another example of the present invention.

First, the rotary jig 31 made of quartz, shown in FIG. 3, was filled with phosphor particles having a composition of (hexagonal ZnS: Ag, Al) in an amount of about 100 g, and was carried in the vapor-phase synthesizing chamber 33 for forming thin films. After that, the vapor-phase synthesizing chamber 33 was evacuated into a suitable vacuum, for example, about $1\times10^{-4}$ Pa. The sample formation temperature was heated up to 350° C. by the heating source 35 and kept at this temperature. Source gases were introduced into the vapor-phase synthesizing chamber 33 from the gas nozzle 36, to thus start the formation of phosphor thin films on the surfaces of the phosphor particle main bodies. As source gases of zinc and sulfur, there were used diethyl-zinc and hydrogen sulfide, respectively. Hydrogen sulfide was diluted up to 1% based on the amount of hydrogen used as a carrier gas. As raw materials of silver and aluminum, there were used silver chloride and triisobutyl aluminum, respectively. These raw materials were introduced substantially simultaneously into the vapor-phase synthesizing chamber 33 using hydrogen as a carrier gas, followed by film formation for two hours at a thin film formation rate of about 1.5 μm/h. After growth of the thin films, the supply of the raw materials was stopped and the sample formation temperature was dropped while the interior of the chamber was evacuated, after of which the sample was taken out of the vapor-phase synthesizing chamber 33. It become apparent that the concentration of Ag in the powder after being coated with the thin films was 500 ppm per 1 g of ZnS, which was the same as that of the initial concentration; and the concentration of Ag in the thin film as the coating layer exhibited a substantially equal value. The structure of the surface-coated phosphor thus obtained has such a cross-sectional structure as shown in FIG. 4. A thin film phosphor 42 having a composition of (ZnS: Ag, Al) is formed on the surface of a phosphor particle 41 of hexagonal ZnS as a nucleus to a thickness of about 3 μm. An average particle size of the surface-coated phosphor was about 17 μm.

Figure 5:
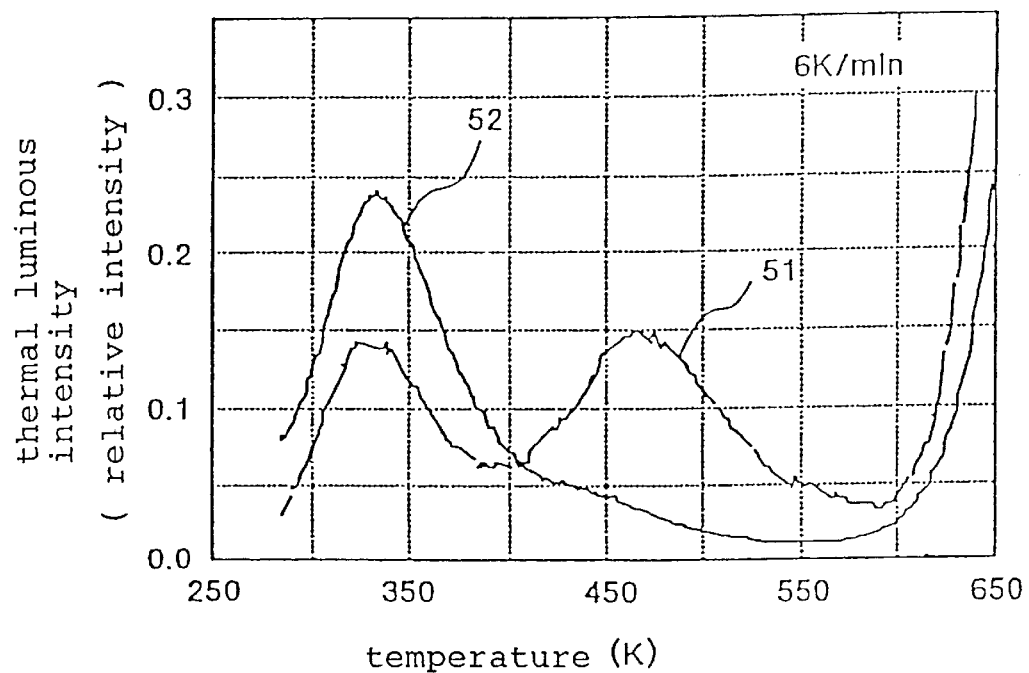
FIG. 5 is a graph showing thermoluminescence glow curves of an inventive phosphor and a related art phosphor.

To confirm the crystalline characteristics of the phosphor, the defect levels of the phosphors were evaluated on the basis of thermoluminescence glow curves thereof. The results of measuring the thermoluminescence glow curves of the surface-coated phosphors prepared in this example are shown in FIG. 5. The measurement was performed by forming carriers by excitation using ultraviolet rays for filling all traps with carriers, and increasing a sample temperature from room temperature to 650 K (377° C.) at a rate of about 6 K/min. Electrons/positive holes are discharged from the traps by the temperature rise, causing light emission. A thermoluminescence glow curve 51 of the phosphor having a composition of (hexagonal ZnS: Ag, Al) in a state before being coated, which is taken as a related art sample, has a peak at a temperature near 330 K (57° C.), that is, near room temperature, and a peak having substantially the same intensity as that appearing near 330 K (57° C.) at a temperature range between 450 K (177° C.) and 500 K (227° C.). On the contrary, a thermoluminescence glow curve 52 of the surface-coated phosphor prepared in this example has a peak at a temperature near room temperature but not having any peak having the same intensity as that of the peak near the room temperature. Namely, it is revealed that the strong peak (at a temperature of 450 K or more) observed in the thermoluminescence glow curve 51 of the related art phosphor can be reduced to be ¼ or less the peak appearing at a temperature near room temperature by surface coating of the phosphor particle according to the present invention. As a result, it is possible to improve the luminous efficiency and current characteristic of the phosphor.

Further, since the thin film phosphor 42 of (ZnS: Ag, Al) used as the coating thin film in this example has the emission spectrum being substantially the same as that of the phosphor particle 41 of (hexagonal ZnS: Ag, Al) used as the nuclei, there is no practical problem such as changes in color tone.

EXAMPLE 2

A surface-coated phosphor was prepared by MOCVD in the same manner as in Example 1, except that a phosphor having a composition of (hexagonal ZnS: Ag, Al) was used as phosphor particle main bodies and ZnS added with no impurity was used as phosphor thin films for coating surfaces of the phosphor particles; and the raw material supply ratio of S and Zn was changed. Concretely, the raw material supply ratio S/Zn was set at 0.5, 1.0, 2.0 and 5.0. The raw materials used are the same as those in Example 1. The time required for formation of thin films for each sample was set at one hour, and the sample formation temperature was set at 350° C.

To confirm crystal characteristics of the surface-coated phosphors prepared in respective conditions, the defect levels of the phosphors were evaluated on the basis of thermoluminescence glow curves thereof as in Example 1. The measurement was performed while increasing the sample temperature from room temperature up to 650 K at a rate of about 6 k/min after excitation by ultraviolet rays as in Example 1. A thermoluminescence glow curve of a phosphor sample having a composition of (hexagonal ZnS: Ag, Al) in a state before being coated, which is taken as a related art sample, has a peak at a temperature near 330 K, that is, near room temperature, and a peak being substantially the same as that appearing near 330 K at a temperature over 370 K (about 100° C.), particularly, in a temperature range of 450 to 500 K. On the contrary, a thermoluminescence glow curve of each of the surface-coated phosphors prepared in this example has a peak at a temperature near room temperature but having no peak having the same intensity as that appearing near room temperature. As a result, it is revealed that the intensity of the strong peak (at a temperature of 450 K or more) observed in the thermoluminescence glow curve of the related art phosphor can be reduced to be one-third or less that of the peak appearing near room temperature. The degree of reduction of the intensity becomes significant as the S component in the surface-coated phosphor is increased. Further, the luminous efficiency of each phosphor prepared in this example is improved by about 20% or more. Additionally, from the experimental results, it is revealed that the same effect can be obtained by formation of a film made of a single element such as S or Zn.

Since the ZnS phosphor thin film as the coating thin film used in this example has a emission band only in an ultraviolet region to the emission spectrum of phosphor particles of (hexagonal ZnS: Ag, Al) as the phosphor main bodies, there is no practical problem such as changes in color tone of the phosphor particles of (hexagonal ZnS: Ag, Al) having a blue luminous component in a visible region.

The formation temperature upon thin film coating was examined. When the formation temperature was over 900° C. used as the synthesizing temperature for ZnS, the luminous efficiency was rather reduced, failing to obtain a sufficient effect. Accordingly, it may be considered that the thin film coating treatment is effectively performed at a temperature less than the synthesizing temperature for ZnS. Also, in terms of stability of ZnS at the thin film formation temperature, and of easiness in thin film formation, the most suitable thin film formation temperature is less than 600° C.

In this example, the diameter of each phosphor particle main body in a state being surface-coated is about 10 μm, and the thickness of the coating layer is 1.5 μm.

EXAMPLE 3

Each surface-coated phosphor was prepared by producing a phosphor of (cubic ZnS: Ag, Al) at a synthesizing temperature of 900° C. in the same procedure as in Example 1, and forming thin films of each of phosphors having compositions of [(ZnS: Ag, Al); single ZnS] on surfaces of particle main bodies of the above phosphor by MOCVD. The raw material supply ratio S/Zn was set at 2.0, and the raw materials used were the same as those in Example 1. The thin film formation time for each sample was set at one hour. The thin film formation temperature was set at 350° C. The diameter of each phosphor particle main body was 8 μm, and the thickness of the surface coating layer was 1.5 μm.

Figure 6:
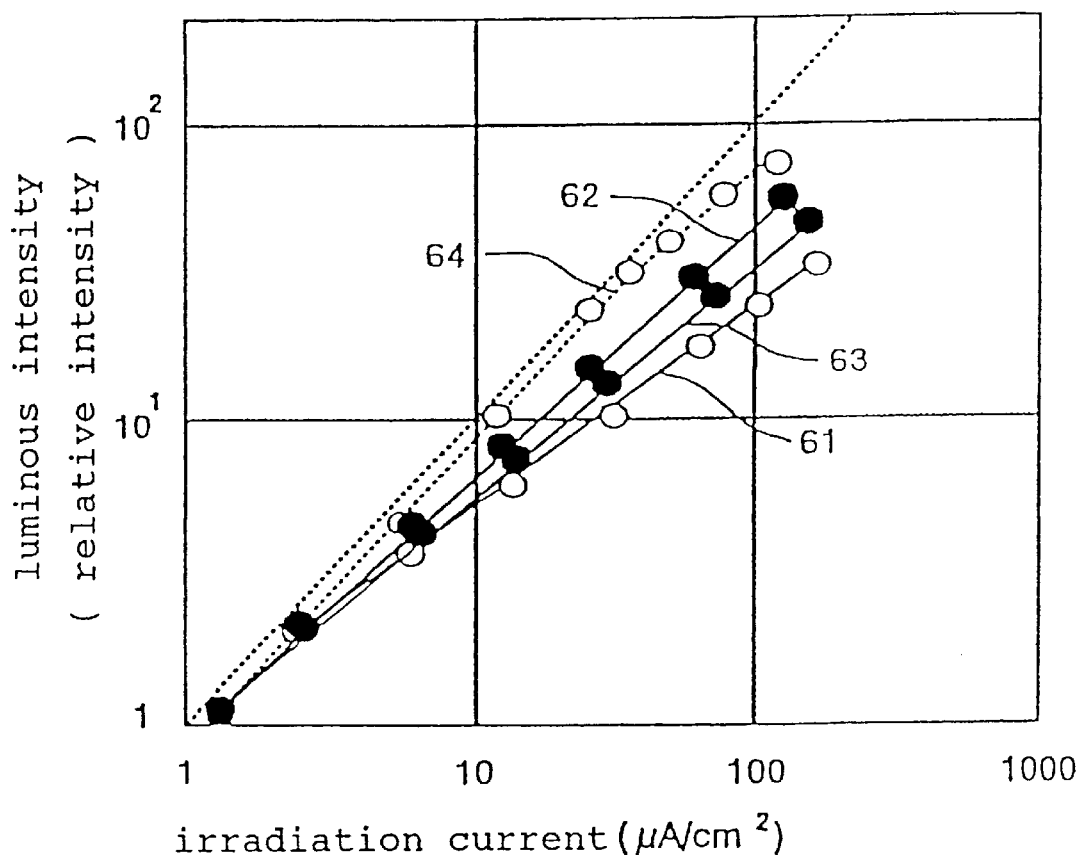
FIG. 6 is a graph showing current characteristics of an inventive phosphor and a related art phosphor.

The results of measuring current characteristics of the surface-coated phosphors prepared in this example are shown in FIG. 6. FIG. 6 also shows a current characteristic 61 of a cubic ZnS phosphor in a state before being surface-coated, which is taken as a related art sample. Each of a current characteristic 62 of the surface-coated phosphor of (ZnS: Ag, Al) and a current characteristic 63 of the surface-coated phosphor of ZnS exceeds the current characteristic 62 over the entire current range. In particular, the current characteristic 62 of the surface-coated phosphor of (ZnS: Ag, Al) is excellent in a low current region. Next, with respect to the projection type cathode-ray tube using each of the surface-coated phosphors, a current coefficient γ of a luminous energy efficiency was measured. The current coefficient γ means an index γ of a relationship that a luminous energy efficiency (quantum efficiency) in a given current density region is approximated to be proportional to the γ-th power of a current density, and it expresses a higher characteristic as it becomes closer to 1. In FIG. 6, the results of measuring a relationship between an irradiation current density and a luminous intensity at an irradiation current density of 15–150 $\mu$A/cm2 are linearly approximated on the logarithmic coordinates. The current coefficient γ of the phosphor of cubic ZnS prepared according to the related art was 0.7 in a low current region (15 $\mu$A/cm2) and 0.65 in a high current region (150 $\mu$A/cm2). On the contrary, the current coefficient γ of the surface-coated phosphor of (ZnS: Ag, Al) was significantly improved into 0.85 and 0.80 in the low and high current regions, respectively; and the current coefficient γ of the surface-coated phosphor of ZnS was also significantly improved into 0.75 and 0.7 in the low and high current regions, respectively. As is apparent from the above results, the surface coating of the cubic ZnS phosphor is effective to improve the current coefficient γ. As a result, by the use of each of the surface-coated phosphors as a phosphor film used under a high current irradiation condition such as in a projection type cathode-ray tube, it becomes possible to suppress the reduction in brightness in a high current region and to suppress the reduction in resolution due to luminous saturation.

A current characteristic 64 of the thin film of the phosphor of (ZnS: Ag, Al) used as the phosphor thin film in this example is also shown in FIG. 6. The current characteristic 64 has a current coefficient γ which is substantially 1 extending from a low current region to a high current region. It is revealed that by formation of the coating thin films having such a characteristic on surfaces of phosphor particle main bodies as nuclei, it becomes possible to significantly improve the luminous efficiency and current characteristics of the phosphor.

EXAMPLE 4

Each surface-coated phosphor was prepared by MOCVD in the same manner as in Example 2, except that surfaces of particle main bodies of a hexagonal ZnS phosphor were coated with thin films of each single element [sulfur (S), zinc (Zn)] constituting the hexagonal ZnS phosphor. The raw materials for S and Zn used are the same as those in Example 1. Other raw materials for S and Zn can be similarly used. The time required for formation of thin films of each single element was set at 30 min. and the thin film formation temperature was set at 450° C. The diameter of each of the phosphor particle main bodies was 10 $\mu$m and the thickness of the surface coating layer was 1 $\mu$m.

To confirm crystal characteristics of the surface-coated phosphors prepared in respective conditions, the defect levels of the phosphors were evaluated on the basis of thermoluminescence glow curves of the phosphors as in Example 1. The measurement was performed while increasing the sample temperature from room temperature up to 650 K at a rate of about 6 k/min after excitation by ultraviolet rays. A thermoluminescence glow curve of a phosphor of (hexagonal ZnS: Ag, Al) in a state before being surface-coated, which is taken as a related art sample, has a peak at a temperature near 330 K, that is, near room temperature, and a peak being substantially the same as that appearing near 330 K at a temperature of 370 K (about 100° C.) or more, particularly, in a temperature range of 450 to 500 K. On the contrary, in a thermoluminescenve glow curve of each of the surface-coated phosphors prepared in this example, the intensity of a peak appearing on the high temperature side is reduced as compared with a peak appearing on the low temperature side. In particular, for the phosphor coated with the sulfur thin films, any peak was not observed on the high temperature side. Thus, it is revealed that the intensity of the strong peak (at a temperature of 450 K or more) observed in the thermoluminescence of the related art phosphor can be reduced to be one-third or less that of the peak appearing near room temperature by the surface coating in this example. Further, in these phosphors, each of the luminous efficiency and the current coefficient is improved by about 10%. Thus, it is reveled that the improvement in luminous efficiency and current coefficient of a phosphor can be achieved not only by coating it with coating films of ZnS containing no impurity as a luminescence center but also by coating it with coating films of a single element such as S or Zn. In addition, as is apparent from the above results, a ZnS film having a composition deviated from the stoichiometric composition also exhibits an effect of improving the luminous efficiency and current coefficient of a phosphor.

EXAMPLE 5

In this example, a surface-coated phosphor was prepared by synthesizing phosphor particle main bodies and forming a thin film of the phosphor particles on a substrate, to form a phosphor main body film, and coating surfaces of the phosphor particles of the main body thin film formed on the substrate with thin films of a phosphor of (ZnS: Cu, Al) by MOCVD. Source gases permeate between the phosphor particle main bodies. Here, there was used a green phosphor (ZnS: Cu, Al) mainly containing ZnS added with Al as a donor and Cu as a donor, and having an average particle size of about 6 $\mu$m. The surfaces of the phosphor main bodies were coated with the thin films of (ZnS: Cu, Al) by MOCVD to a thickness of about 5 $\mu$m, to prepare the surface-coated phosphor.

The particle main bodies of the phosphor of (ZnS: Ag, Al) were dispersed in a distilled water, followed by sufficient stirring and mixing, to form a phosphor dispersed solution. The solution was applied on a Ni-plated Cu substrate by a flocculation process using potassium silicate, to form a phosphor film having a thickness of about 5 mg/cm2. The surfaces of the phosphor particle main bodies forming the phosphor film were coated with the thin films at a substrate temperature of 350° C. and at a thin film formation rate of 0.5 $\mu$m/hr. Here, a current coefficient γ of a direct-view type cathode-ray tube using the surface-coated phosphor was measured at an irradiation current density of 1–10 $\mu$A/cm2. The current coefficient γ was 0.65 for the phosphor in a state before being surface-coated and 0.70 for the surface-coated phosphor. Accordingly, it becomes apparent that by the use of the surface-coated phosphor as a phosphor film operated under a low current irradiation condition such as in a direct-view type cathode-ray tube, it is possible to reduce the luminous saturation. The pair of Cu and Al as the luminescence center may be replaced with the other combination of an acceptor and a donor.

EXAMPLE 6

In this example, a surface-coated phosphor was prepared by synthesizing phosphor particle main bodies in accordance with the related art manner while giving motions to them, and coating surfaces of the phosphor particle main bodies with phosphor thin films at the same time when the synthesis of the phosphor particle main bodies was completed. The synthesizing temperature of the phosphor particle main bodies was set at 1200° C. and the particle size of the phosphor particle main bodies was 8 μm or less in diameter. Here, there was used a blue phosphor of (ZnS: Ag, Al) containing ZnS added with Al as a donor and Ag as an acceptor. The surfaces of the particle main bodies of such a phosphor were coated with thin films of a phosphor of (ZnS: Ag, Al) by MOCVD to a thickness of about 1 μm.

Hereinafter, a process of producing the phosphor used in this example will be concretely described. First, a powder of ZnS having a particle size of about 1 μm was added with a silver nitrate as a raw material of an acceptor Ag in an amount of 600 μg on the basis of 1 g of the base material (ZnS) and aluminum nitrate as a raw material of a donor Al in an amount being twice the amount of Ag in terms of atomic number ratio. The mixture thus obtained was synthesized in a sulfidizing atmosphere. In this example, a hydrogen sulfide gas was used, and the synthesizing time was set at two hours. At this time, the synthesizing temperature was set at 1200° C., to obtain particles of hexagonal ZnS phosphor. In this example, to reduce the contact between phosphor particles during synthesis, a jig holding the phosphor particles was usually rotated. Thus, the surfaces of the phosphor particle main bodies (as nuclei) thus obtained were coated with the thin films of (ZnS: Ag, Al) by MOCVD. In this example, thin film coating was performed successively to completion of the synthesis. The steps including synthesis of the phosphor particles and thin film coating were performed using the surface coating apparatus described in Example 1 with reference to FIG. 1. The reaction gases were continuously introduced until the temperature was dropped from 1200° C. to a temperature of 600° C. or less at which thin films was coated. Here, the coating thin film was formed at 400° C. for one hour.

The average particle size of the surface-coated phosphor synthesized in such a procedure can be reduced to 8 μm at the rotational speed of 0.5 rpm and 5 μm at the rotational speed of 50 rpm, each of which is about one-half or less of the particle size (13 μm) of the surface-coated phosphor prepared in the conventional non-rotational condition. However, the rotational manner may be replaced with any manner capable of giving motions to phosphor particles as nuclei in the steps of synthesizing the phosphor particle main bodies and forming thin films on the surfaces of the phosphor particle main bodies. Further, it is effective that the thin film coating is performed after synthesis of small-sized particles using a flux or the like.

To confirm crystalline characteristics of the phosphors, the defect levels of the phosphors were evaluated on the basis of thermoluminescence glow curves of the phosphors. The related art small-sized phosphor exhibits a strong glow peak at a temperature of 370 K or more. On the contrary, in a thermoluminescence glow curve of each of the surface-coated phosphors having particles sizes of 5 μm and 8 μm prepared in this example, the intensity of the peak on the high temperature side is weakened.

Figure 7:
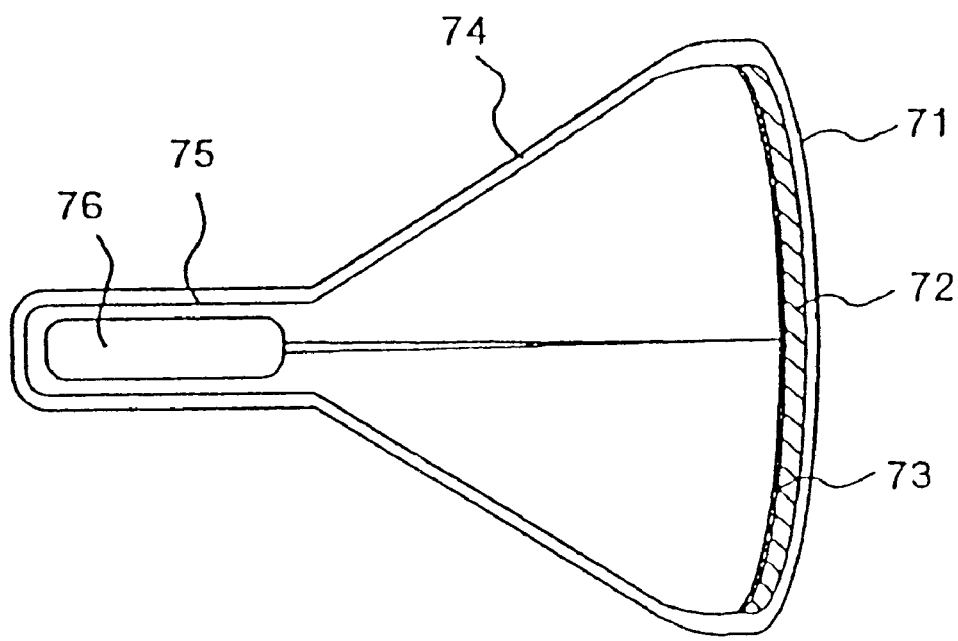
FIG. 7 is a schematic sectional view showing a cathode-ray tube having a phosphor film screen.
Figure 8:
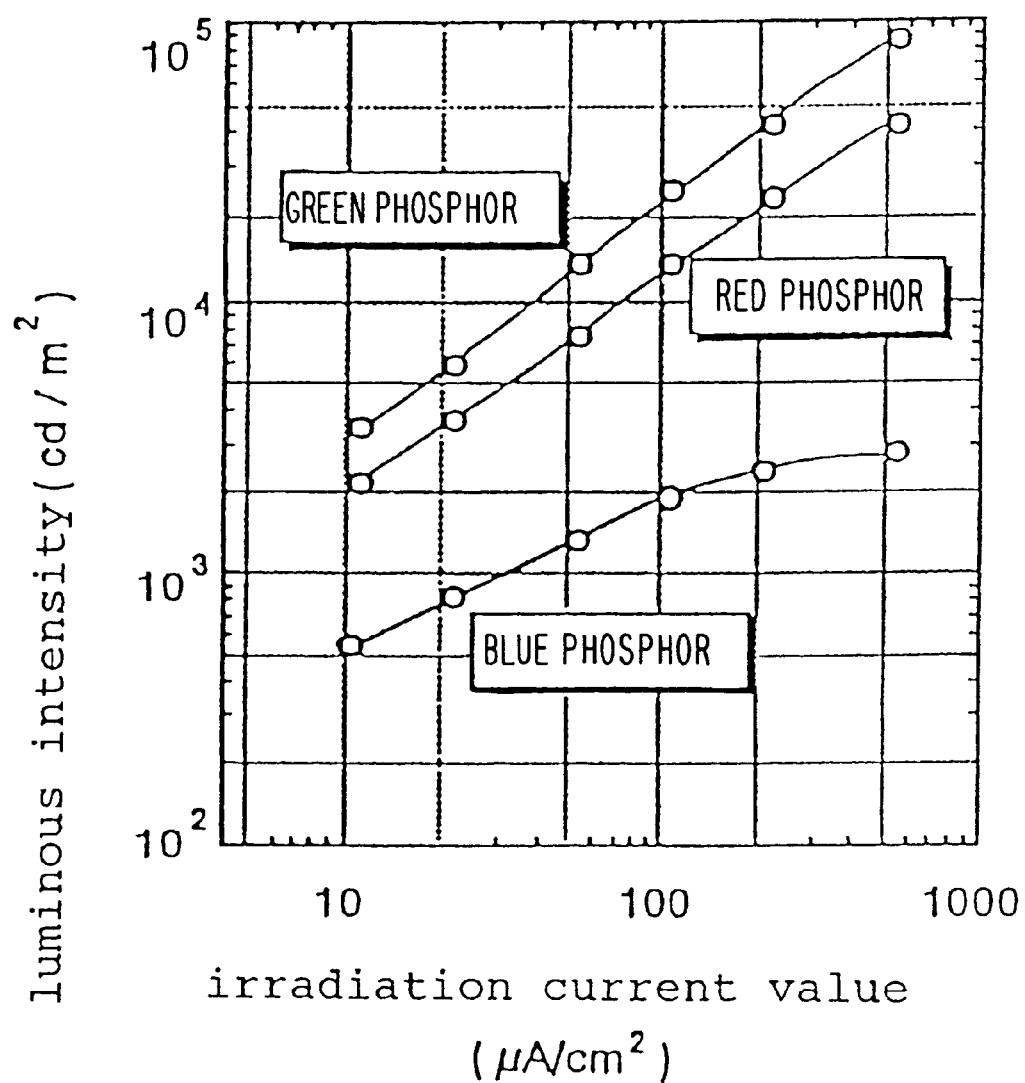
FIG. 8 is a graph showing each of current characteristics of three primary color phosphors used for a related art cathode-ray tube.
Figure 9:
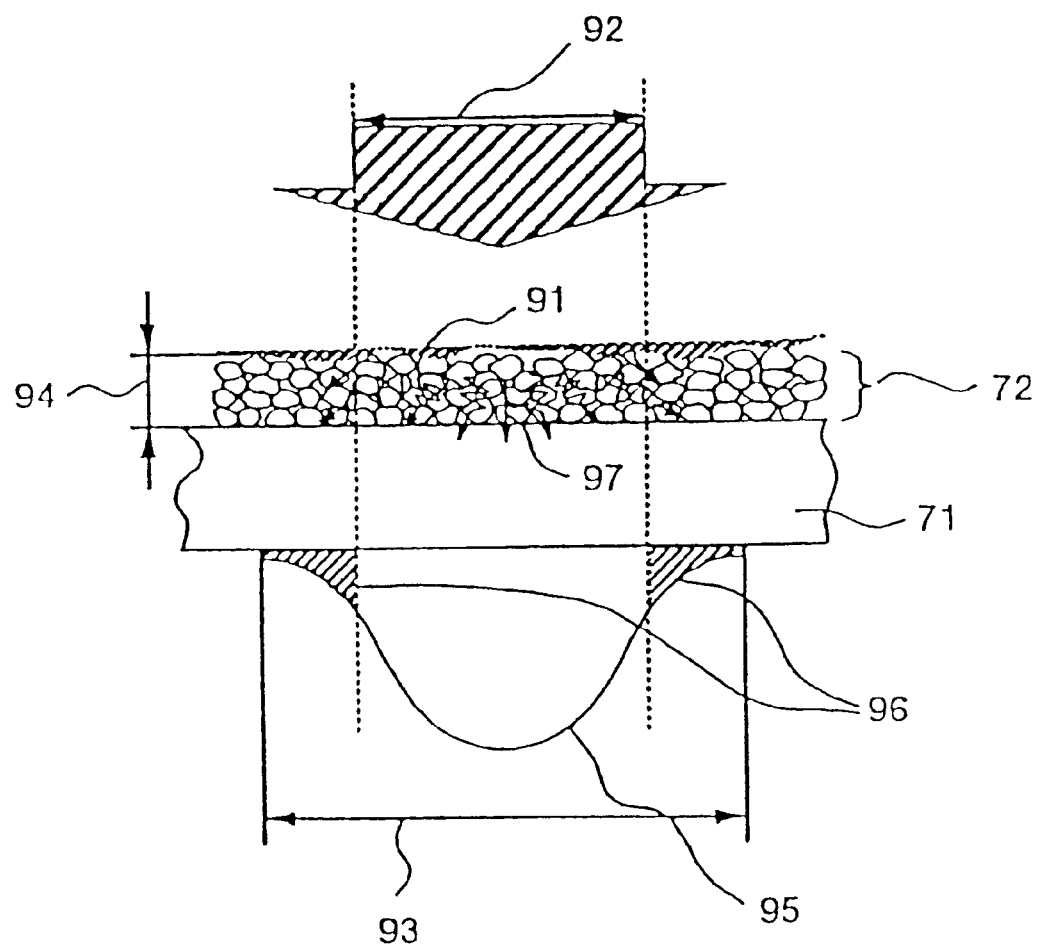
FIG. 9 is a schematic view illustrating the scattered locus of light in a phosphor film made from a related art phosphor.

Next, a phosphor screen 72 of a 7 inch projection type cathode-ray tube having a structure shown in FIG. 7 was prepared using each of the above phosphors, and was subjected to real test for examining the resolution. The phosphor film screen 72 was formed in the following procedure. A phosphor dispersed solution prepared in the same manner as in Example 1 was applied on a 7 inch glass panel (that is, face plate) 71 provided with a funnel 74 by a flocculation process using potassium silicate, to form the phosphor film 72 of about 5 mg/cm2. Further, after the filming step and an aluminum back 73 forming step, an electron gun 76 having a performance exhibiting a spot diameter of 0.11 mm at an irradiation current (1 k) of 0.5 mA was mounted in a neck portion 75, to thus prepare a projection type cathode-ray tube. The brightness and resolution of the phosphor screen 72 of the cathode-ray tube were measured by irradiating an electron beam thereto in conditions of an acceleration voltage of 30 kV, irradiation current of 0.5 mA and an irradiation area of 102×76 mm2. The brightness of the surface-coated phosphor of (ZnS: Ag, Al) having a particle size of 5 μm and the brightness of the surface-coated phosphor of (ZnS: Ag, Al) having a particle size of 8 μm were improved by 100% and 115% respectively as compared with the brightness of the non-coated phosphor of (cubic ZnS: Ag, Al) having a particle size of 8 μm. Such an improvement in brightness is considered to be due to improvement in saturation brightness. With respect to the resolution, in the case where the diameter of an electron beam is 0.11 mm, a spot diameter for the related art phosphor is spread up to 0.18 mm; however, the spot diameters for the surface-coated phosphors of (ZnS: Ag, Al) having particles sizes of 5 μm (film thickness: 15–18 μm) and 8 μm (film thickness: 25–28 μm) can be reduced up to 0.13 mm and 0.17 mm, respectively. This is considered to be due to the fact that the degradation of the resolution resulting from reduction in particle size of the phosphor and saturation brightness thereof is reduced. In addition, the film thickness of the phosphor is generally set to be about three times the particle size of the phosphor. For the related art small-sized phosphor, the brightness is significantly reduced; however, according to the surface coating performed in this example, it becomes possible to provide the surface-coated phosphor with a high brightness and a luminous saturation improvement, and hence to realize a cathode-ray tube with a high resolution. Although a phosphor film for the future HDTV needs to realize such a resolution that the luminous spot diameter is 0.17 mm or less, preferably, 0.15 mm or less, the phosphor having a particle size of 8 μm, and further 6 μm prepared in this example can realize such a resolution. However, in the exiting phosphor film formation technology, the thickness of a uniform phosphor film formed on a substrate is limited to about 10 μm, and in this regard, if a technology capable of reducing the film thickness to a value closer to zero is developed, the resolution can be further increased.

EXAMPLE 7

In this example, surfaces of particle main bodies of each phosphor having a composition of [(Y2O3:Eu); (Y3Al3Ga2O12:Tb); (Y2SiO5:Tb)] coated with coating layers of an oxide. Here, the film formation for surface coating was performed by sputtering.

Figure 10:
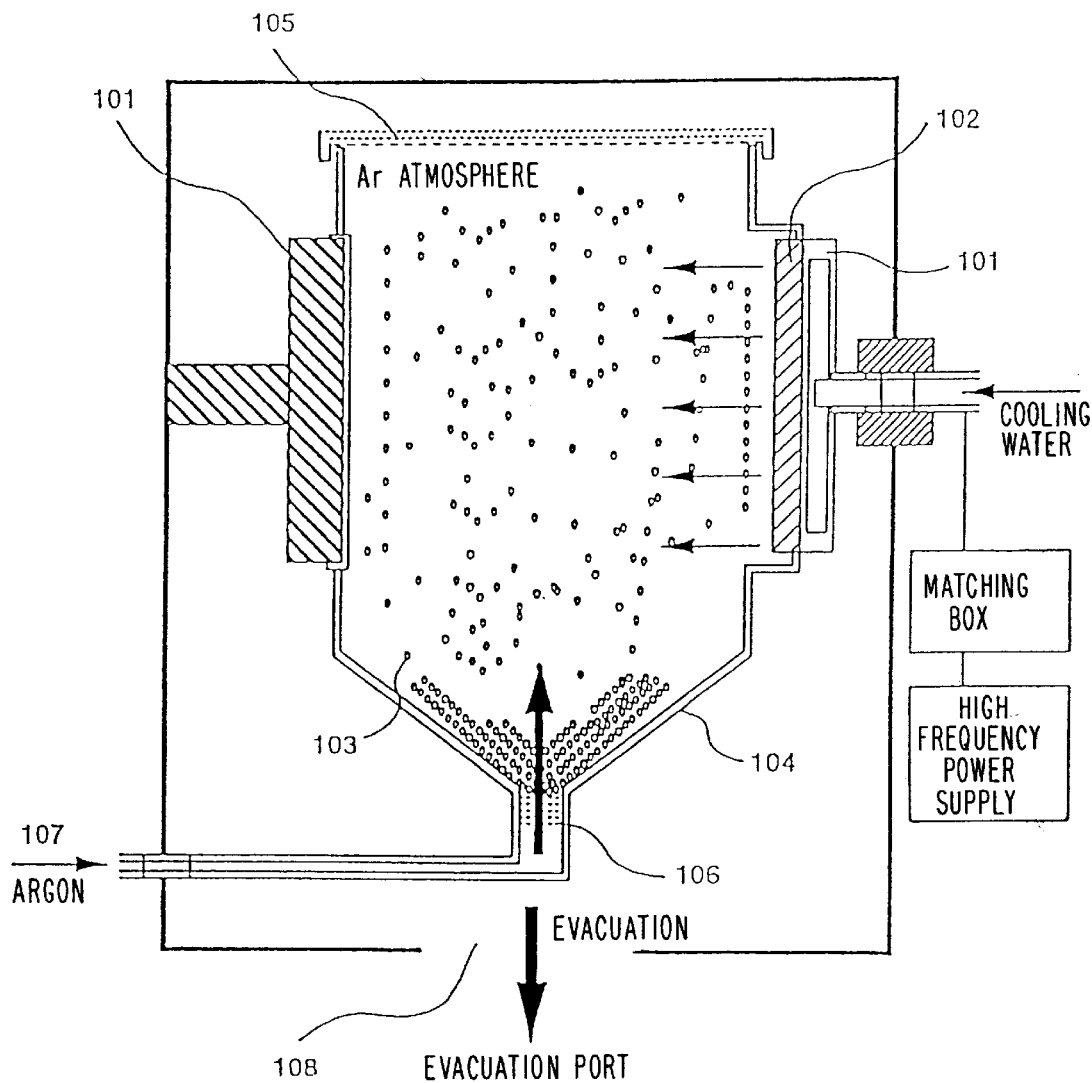
FIG. 10 is a schematic view illustrating an apparatus for coating surfaces of phosphor particles by sputtering used in some examples of the present invention.

The outline of a sputtering apparatus used in this example is shown in FIG. 10. Counter electrodes 101 were disposed in the horizontal direction and a target 102 was disposed on one of the counter electrodes 101. A jig 104 made of quartz was filled with phosphor particles 103 as phosphor main bodies, and was mounted with a cap 105. A filter 106 not allowing the phosphor particles 103 to pass therethrough was mounted on the bottom of the jig 104, and the cap 105 was provided with a gas hole in which a filter was mounted. The quartz made jig 104 has a structure capable of floating the phosphor particles 103 by a gas (for example, argon) introduced from the outside. The gas was introduced through a piping capable of controlling the gas pressure and the amount of the gas for adjusting the gas flow rate. The phosphor particle main bodies 103 as nuclei were given suitable motions in the jig 104 by an inert gas or oxygen gas.

In this example, there were prepared the sputtering targets 102 made of Y2O3, Al2O3, Ga2O3 and SiO2. The target 102 was exchanged in matching with the kind of the phosphor particle main bodies 103 as nuclei. Active elements sputtered from the target 102 collide with the phosphor particle main bodies 103 floating in the quartz made jig 104, to form suitable films on the surfaces of the phosphor particles 103. In this case, since the phosphor particles 103 are moved by the gas pressure, the surfaces thereof are uniformly coated with thin films.

In FIG. 10, reference numeral 107 indicates a gas introduction portion, and 108 is an evacuation port.

In this example, the diameter of each of the phosphor particles in a state before being surface-coated was set at about 8 µm and the thickness of the coating layer was set at 1 µm.

The surface-coated phosphors thus obtained have structures in which the surfaces of the particles main bodies of the phosphor of (Y2O3:Eu) are coated with thin films of (Y2O3); the surfaces of the phosphor of (Y3Al3Ga2O12:Tb) are coated with uniformly mixed thin films of Y2O3, Al2O3 and Ga2O3; and the surfaces of the particles main bodies of the phosphor of (Y2SiO5:Tb) are coated with uniformly mixed thin films of Y2O3 and SiO2. In the case of formation of the uniformly mixed film, the mixture of respective oxides was used as a target. Each of the phosphors thus obtained was observed to be improved in terms of saturation brightness by 2–4%. Further, the present invention can be applied to other phosphor materials, if any one of components thereof contains molecules capable of being formed in the thin film formation process.

EXAMPLE 8

In this example, a surface-coated phosphor was prepared by coating surfaces of particle main bodies of each phosphor having a composition of [(ZnS: Cu, Al); (ZnS: Ag, Al)] with thin films of the same kind of phosphor having a reduced resistance(that is, electrically conductive property). Here, the thin film formation for surface coating was performed by sputtering, as in Example 7. As a sputtering target, there was used a material of (ZnS: Al). A quartz made jig was filled with each kind of phosphor particle main bodies as nuclei, and active elements were sputtered from the target to collide with phosphor particles floating in the jig, to form suitable thin films on the surfaces of the phosphor particles. At this time, since the phosphor particles are moved by a gas pressure, they are uniformly coated with thin films. The material of (ZnS: Al) has a surface resistance of about 100 K Ω which is one or two digits lower than a resistance of ZnS in the order of M Ω. In this example, the diameter of each of the phosphor particles in a state before being surface-coated was 5 µm and the thickness of the surface coating layer was 0.5 µm.

The surface-coated phosphors thus obtained have structures in which the surfaces of the phosphor particle main bodies of (ZnS: Cu, Al) are coated with thin films of the phosphor (ZnS: Al); and the surfaces of the phosphor particle main bodies of (ZnS: Ag, Al) are coated with thin films of the phosphor of (ZnS Al). Each of the phosphors was observed to be sufficiently improved in brightness and saturation brightness not only for an electron beams accelerated at a high voltage but also for an electron beam at an acceleration voltage of 5 kV or less. Each of the surface-coated phosphors was then applied as a phosphor film of a powder type electroluminescence (EL) device or a vacuum fluorescent display in which a phosphor film having a reduced resistance is desirable. For the powder type El, after formation of a transparent electrode on a glass substrate, an organic binder containing the surface-coated phosphor of (ZnS: Cu, Al) was uniformly applied thereon, followed by drying, and an Al thin film was formed as a metal electrode. A voltage was applied between the electrodes of the powder type El thus prepared, with a result that green EL was observed. In particular, it was observed that the El was excellent in service stability and exhibited a half-life of 10,000 hr or more. Similarly, the low resistance surface-coated phosphor of (ZnS: Ag, Al) was used as a phosphor film of a vacuum fluorescent display. In this case, blue luminescence excellent in stability was obtained by reducing degradation of a cathode due to separation of a sulfur component as one of the related art problems. Thus, it is effective to apply part of the surface-coated phosphor of the present invention as a phosphor film or active layer of a spontaneously emissive type display.

EXAMPLE 9

Figure 2:
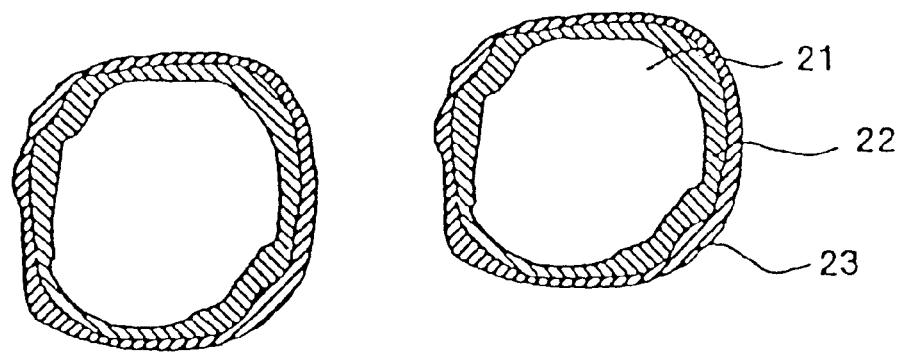
FIG. 2 is a sectional view showing a surface-coated phosphor particle prepared in one example of the present invention.

FIG. 2 shows the cross-section of a surface-coated phosphor having a double coating structure prepared in this example. The surface-coated phosphor having a double coating structure is prepared by forming non-luminous thin films 23 on surfaces of the surface-coated phosphor (composed of the phosphor particle main bodies 21 whose surfaces are coated with the coating layers 22). This is effective to improve a resistance against an excitation energy source. With this structure, it becomes possible to prevent reduction in brightness and current coefficient of a surface-coated phosphor, and hence to further improve the service life of the surface-coated phosphor and realize a high reliability cathode-ray tube and display using the phosphor.

The inner layer of the above double coating structure may be composed of the above-described coating layer, and the outer layer is generally composed of a non-emissive thin film such as an oxide film but it may be composed of a material exhibiting an emission spectrum having an energy higher than that of the inner layer.

In this example, a surface-coated phosphor having a double coating structure was formed by coating, using MOCVD, surfaces of the surface-coated phosphor prepared in Example 1 with coating thin films having a high resistance against an excitation energy source. Concretely, surfaces of phosphor particle main bodies 41 of (ZnS: Ag, Al) shown in FIG. 4 as nuclei were coated with thin films 42 of a phosphor of (ZnS: Ag, Al). Namely, the coating thin films of (ZnS: Ag, Al) was formed on the surfaces of the phosphor particles of (ZnS: Ag, Al) having a particle size of 8 µm to a thickness of about 1 µm. And, SiO2 thin films as the second surface-coating thin films were formed by sputtering on surfaces of the phosphor particles thus obtained to a thickness of about 0.2 µm, to prepare a surface-coated phosphor having a double coating structure.

The phosphor particles thus obtained were dispersed in a distilled water, followed by sufficient stirring and mixing, to obtain a phosphor dispersed solution. The phosphor dispersed solution was applied on a Ni plated Cu substrate by a sedimentation process using potassium silicate, to form a phosphor film having a thickness of about 5 mg/cm2. The phosphor film thus formed on the substrate was irradiated with electron beams of 300 µA in a range of 1×1 cm2 in a state that the substrate was heated to 300° C., and the brightness holding ratio (brightness ratio between before and after irradiation) of the phosphor film was measured. The brightness holding ratio thus measured was 0.90, which was sufficiently improved as compared with the value (0.85) in the case of using the related art non-coated phosphor, and which was also improved as compared with the value (0.88) in the case of using the surface-coated phosphor having a single coating structure. In this way, the phosphor having a double surface coating structure can significantly improve the resistance against an excitation source.

As is apparent from the above-described examples, by applying the surface coating technique of the present invention to a related art phosphor or a small-sized phosphor, it is possible to improve the current coefficient of the phosphor and to improve the service life of a display element using the phosphor. In particular, it is possible to realize a cathode-ray tube improved both in brightness and resolution using the above phosphor.

INDUSTRIAL APPLICABILITY

According to the present invention, it is possible to provide a cathode-ray tube including a phosphor film made of a phosphor, particularly, a blue phosphor reduced in luminous saturation behavior (current coefficient: 0.7 or more, and further 0.85 or more) and enhanced in life characteristics, and hence to realize a bright and reliable color TV receiver having a resolution capable of being matched with HDTV using the above cathode-ray tube. Also, since the phosphor of the present invention can be applied to other displays making use of excitation due to low velocity electron beams, ultraviolet rays and electric field, there can be provided a spontaneously emissive displays excellent in service life and brightness.

What is claimed is:

1. A powdered phosphor composed of phosphor particles, each of said phosphor particles comprising:
   a phosphor particle main body having a surface; and
   a coating layer coating on said surface of said phosphor particle main body, said coating layer having a thickness of at most 5 $\mu$m;
   wherein said coating layer is made of a material selected from a group consisting of
   i) a material being the same as a material of said phosphor particle main body;
   ii) a material consisting of a base material being the same as a base material of said phosphor particle main body and one additive selected from a group consisting of an activator and a coactivator added to said phosphor particle main body;
   iii) a material being the same as the base material of said phosphor particle main body, wherein the base material of said phosphor particle main body is a material selected from the group consisting of ZnS and $Y_2O_3$; and
   iv) a material consisting of at least one element constituting the base material of said phosphor particle main body and being different from the base material of said phosphor particle main body, wherein the base material of said phosphor particle main body is a material selected from the group consisting of ZnS, $Y_3Al_3Ga_2O_{12}$ and $Y_2SiO_5$, and said at least one element constituting the base material of ZnS is S.

2. A phosphor according to claim 1, wherein said phosphor particle main body is made from a ZnS based phosphor.

3. A phosphor according to claim 2, wherein said coating layer is made of a material selected from the group consisting of said material i) and said material ii), and said coating layer is made from an electrically conductive material.

4. A phosphor according to claim 2, wherein the thickness of said coating layer is 0.5 $\mu$m or less.

5. A phosphor according to claim 2, wherein when a thermoluminescence glow curve of said phosphor is measured from room temperature after exciting said phosphor by ultraviolet rays, with emission peak wavelengths of a donor and an acceptor added to said phosphor particle main body as luminescence centers taken as monitor wavelengths, a thermoluminescence intensity of the thermal emission spectrum at a temperature of 100° C. or more is one-third or less of an intensity of the initial peak appearing near room temperature; and
   a current coefficient of a luminous energy efficiency of said phosphor, which is measured by irradiating said phosphor with an electron beam having a current density of 15 $\mu$A/cm2 at an accelerating voltage of 25 kV or more, is 0.75 or more.

6. A phosphor according to claim 5, wherein said current coefficient is 0.85 or more.

7. A phosphor according to claim 2, wherein when a thermal luminous spectrum of said phosphor is measured from room temperature after exciting said phosphor by ultraviolet rays, with emission peak wavelengths of a donor and an acceptor added to said phosphor particle main body as luminescence centers taken as monitor wavelengths, a thermoluminescence intensity of the thermoluminescence glow curve at a temperature of 100° C. or more is one-third or less of an intensity of the initial peak appearing near room temperature; and
   a current coefficient of a luminous energy efficiency of said phosphor, which is measured by irradiating said phosphor with an electron beam having a current density of 75 $\mu$A/cm2 at an accelerating voltage of 25 kV or more, is 0.70 or more.

8. A phosphor according to claim 2, wherein said coating layer is made from a ZnS based phosphor, and is formed at a temperature lower than that of said phosphor particle main body or a temperature of 600° C. or less.

9. A phosphor film comprises said phosphor according to claim 1.

10. A display having, as a spontaneously luminous body, said phosphor according to claim 1.

11. A phosphor according to claim 1, wherein the coating layer, of said material, is a layer that eliminates defects of constituent elements of the phosphor, on the surface of the phosphor particle main body.

12. A cathode-ray tube comprising a phosphor film screen formed on a face plate, said phosphor film screen being formed of said phosphor according to claim 1.

13. A cathode-ray tube according to claim 12, wherein the thickness of said phosphor film is 30 $\mu$m or less.

14. A cathode-ray tube according to claim 12, wherein the thickness of said phosphor film is 25 $\mu$m or less.

15. A cathode-ray tube according to claim 12, wherein a luminous spot diameter of said phosphor film is 130–170 $\mu$m.

16. A display having, as a spontaneously luminous body, a phosphor composed of phosphor particles, each of the phosphor particles comprising a phosphor particle main body having a surface and a coating layer on said surface, said coating layer having a thickness of at most 5 $\mu$m, said phosphor particle main body being made of a Zn based phosphor. the coating layer being made of S.

17. A display according to claim 16, wherein said Zn based phosphor, of which the phosphor particle main body is made, is a ZnS phosphor.

18. A powdered phosphor composed of phosphor particles, each of said phosphor particles comprising:
   a phosphor particle main body having a surface; and a coating layer coating on said surface of said phosphor particle main body, said coating layer having a thickness of at most 5 μm;

wherein said coating layer is made of a material selected from a group consisting of
  i) a material being the same as a material of said phosphor particle main body;
  ii) a material consisting of a base material being the same as a base material of said phosphor particle main body and one additive selected from a group consisting of an activator an a coactivator added to said phosphor particle main body; and
  iii) a material being the same as the base material of said phosphor particle main body; and wherein said coating layer is further coated on an outer side thereof with a high resisting film.

19. A phosphor according to claim 8, wherein said high resisting film is made of a material selected from the group consisting of $Al_2O_3$ and $SiO_2$.

* * * * *